United States Patent
Guggenmos et al.

(10) Patent No.: US 8,740,185 B2
(45) Date of Patent: Jun. 3, 2014

(54) VALVE MODULE, IN PARTICULAR SOLENOID VALVE FOR A BRAKE SYSTEM OF A MOTOR VEHICLE, METHOD FOR THE PRODUCTION OF SAID TYPE OF VALVE MODULE

(75) Inventors: Harald Guggenmos, Immenstadt/Seifen (DE); Florian Rispler, Hirschegg (AT); Friedrich Mueller, Immenstadt (DE); Anton Fritz, Ofterschwang (DE); Philip Tannheimer, Rettenberg (DE); Elmar Vier, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 33 days.

(21) Appl. No.: 13/519,286

(22) PCT Filed: Nov. 4, 2010

(86) PCT No.: PCT/EP2010/066774
§ 371 (c)(1),
(2), (4) Date: Nov. 12, 2012

(87) PCT Pub. No.: WO2011/079984
PCT Pub. Date: Jul. 7, 2011

(65) Prior Publication Data
US 2013/0193362 A1 Aug. 1, 2013

(30) Foreign Application Priority Data
Dec. 28, 2009 (DE) .......................... 10 2009 055 340

(51) Int. Cl.
*F16K 31/02* (2006.01)
(52) U.S. Cl.
USPC .................................. 251/129.15; 303/119.2
(58) Field of Classification Search
USPC .................................. 251/129.15; 303/119.2
See application file for complete search history.

(56) References Cited

U.S. PATENT DOCUMENTS

| | | | | |
|---|---|---|---|---|
| 6,019,128 A | * | 2/2000 | Reiter | 137/549 |
| 6,554,375 B1 | * | 4/2003 | Dinkel et al. | 303/119.3 |
| 6,796,619 B1 | * | 9/2004 | Hinz et al. | 303/119.2 |

(Continued)

FOREIGN PATENT DOCUMENTS

| | | |
|---|---|---|
| DE | 10 2005 049 124 A1 | 4/2007 |
| EP | 0 999 391 A2 | 5/2000 |
| EP | 1 211 448 A2 | 6/2002 |
| EP | 2 261 094 A2 | 12/2010 |
| JP | 10-38128 A | 2/1998 |
| WO | 93/19961 A1 | 10/1993 |
| WO | 2007/033855 A1 | 3/2007 |
| WO | 2010/142509 A1 | 12/2010 |

OTHER PUBLICATIONS

International Search Report corresponding to PCT Application No. PCT/EP2010/066774, mailed Jan. 26, 2011 (German and English language document) (8 pages).

*Primary Examiner* — John K Fristoe, Jr.
*Assistant Examiner* — Matthew W Jellett
(74) *Attorney, Agent, or Firm* — Maginot, Moore & Beck

(57) ABSTRACT

A valve module, in particular a solenoid valve for a brake system of a motor vehicle, is disclosed. The valve module includes an essentially cylindrical-shaped valve base body in which a valve needle is arranged in an axially displacable manner, and a housing cap which closes the valve base body on one end. The cap is maintained on the valve base body by at least one holding device. The maintaining device includes at least one recess on the outer surface of the cover of the valve base body into which plastically deformed material of the housing cap is introduced. A method for producing this type of valve module is also disclosed.

8 Claims, 3 Drawing Sheets

(56) References Cited

U.S. PATENT DOCUMENTS

| | | | |
|---|---|---|---|
| 6,873,514 B2 * | 3/2005 | Maller et al. | 361/160 |
| 7,172,171 B2 * | 2/2007 | Doehla et al. | 251/129.15 |
| 7,866,625 B2 * | 1/2011 | Lee et al. | 251/30.04 |
| 8,113,596 B2 * | 2/2012 | Lee et al. | 303/119.2 |
| 8,375,985 B2 * | 2/2013 | Lee et al. | 137/550 |
| 8,474,787 B2 * | 7/2013 | Fink et al. | 251/129.02 |
| 2009/0283707 A1 | 11/2009 | Kam | |
| 2011/0198522 A1 * | 8/2011 | Ambrosi et al. | 251/129.15 |
| 2012/0267555 A1 * | 10/2012 | Dinerman et al. | 251/129.15 |

\* cited by examiner

VALVE MODULE, IN PARTICULAR SOLENOID VALVE FOR A BRAKE SYSTEM OF A MOTOR VEHICLE, METHOD FOR THE PRODUCTION OF SAID TYPE OF VALVE MODULE

This application is a 35 U.S.C. §371 National Stage Application of PCT/EP2010/066774, filed on Nov. 4, 2010, which claims the benefit of priority to Ser. No. DE 10 2009 055 340.1, filed on Dec. 28, 2009 in Germany, the disclosures of which are incorporated herein by reference in their entirety.

The disclosure relates to a valve module, in particular for a brake system of a motor vehicle, with an essentially cylindrical valve basic body, in which a valve needle is arranged axially displaceably, and with a housing cap which closes the basic body at one end and which is held on the basic body by means of at least one holding device.

The disclosure relates, furthermore, to a method for the production of a valve module, in particular as was described above, in which an at least essentially cylindrical valve basic body, in which a valve needle is arranged axially displaceably, is pushed into a housing cap closed at one end and is connected securely to the latter.

BACKGROUND

Valve modules and methods for producing the generic type are known from the prior art. Thus, for example, valve modules from brake systems of motor vehicles are known, which, in a non-actuated state, cause brake fluid to pass through, in order to build up pressure in the brake system, and which, in an actuated state, close the flow cross section after the pressure build-up has taken place, in order to hold the pressure. Solenoid valves, in particular, have proved to be highly suitable in this case. Known valves have an essentially cylindrical valve basic body, in which a valve needle is axially displaceable, for example under magnetic control. The valve basic body is closed at one end by a housing cap which forms a capsule around the basic body and which is secured to the latter by means of a holding device. As is known, the holding device is formed as a weld seam which extends over the entire circumference and which connects the housing cap and the valve body inseparably to one another, as a result of which, on the one hand, the leaktightness of the valve can be ensured and, on the other hand, high forces generated when the valve is in operation can be absorbed.

SUMMARY

According to the disclosure, there is provision for the holding device to comprise at least one depression over the outside of the casing of the valve body, plastically deformed material of the housing cap being introduced into said depression. There is therefore provision for the housing cap to be deformed plastically in regions, so that it engages by means of the plastically deformed region into a depression of the valve basic body. The housing cap is thereby held positively on the valve basic body. In comparison with conventional weld seams, this holding device affords an especially cost-effective and simply implementable possibility for connecting the housing cap to the valve basic body. In order to ensure the leaktightness of the valve sufficiently, the housing basic body is advantageously pressed into the valve cap, so that the outer surface area of the valve basic body bears against the inner surface area of the housing cap.

Advantageously, the depression is designed as a groove, in particular as an annular groove. The groove thus advantageously extends as an annular groove over the entire circumference of the valve basic body. The housing cap may have one or more plastically deformed regions which engage into the groove. Preferably, the housing cap is deformed plastically over its entire circumference so that it has an annular bead engaging into the groove. By virtue of the annular bead and/or the annular groove being appropriately shaped, a leaktight connection, which, where appropriate, makes the pressed-together bond unnecessary, can in this case likewise be implemented.

Advantageously, for this purpose, at least one side flank of the groove or annular groove forms a slope. The slope, on the one hand, makes it easier for the material of the housing to be introduced into the groove and, on the other hand, can perform a centering function.

Preferably, the groove has an at least essentially V-shaped cross section, the side flanks consequently oriented obliquely approaching one another toward the groove bottom. During the introduction or plastic deformation of material of the housing cap, the latter and the deforming tool are oriented axially on the basic body by virtue of the centering function of the V-shaped groove.

Alternatively, the groove has an undercut design. Thus, for example, the groove may likewise have a V-shaped cross section, between which the side flanks depart from one another toward the bottom of the groove. As a result, during the plastic deformation of the housing cap, the material can engage into the undercut of the groove or annular groove and thereby form an especially firm holding device which is difficult to release or is even unreleasable.

Advantageously, as seen in the push-in direction into the housing cap, the valve basic body has a smaller diameter behind the groove than in front of the groove, so that that portion of the valve basic body which is pushed in first has a smaller diameter. As a result, axial orientation of the housing cap on the valve basic body can be implemented in a simple way. The step thus formed in the longitudinal section of the valve basic body can in this case serve as an axial stop for the housing cap.

Furthermore, there is provision for the groove to have one or more recessed pockets arranged so as to be distributed over the circumference. A larger quantity of material of the housing cap can be introduced into these pockets, this being particularly important when the housing cap is plastically deformed over its entire circumference or is tapered plastically. Furthermore, the recessed pockets afford an additional safeguard against the twisting of the housing cap on the valve basic body.

Preferably, the housing cap is designed as a sheet metal part and/or the valve basic body is designed as a valve insert sleeve.

The method according to the disclosure for the production of a valve is distinguished in that, for securing, material of the housing cap is introduced into at least one depression on the outside of the casing of the basic body by means of plastic deformation. The advantages already described above are thereby afforded.

BRIEF DESCRIPTION OF THE DRAWINGS

The invention will be explained in more detail below by means of the drawing in which.

DETAILED DESCRIPTION

Figure 1:
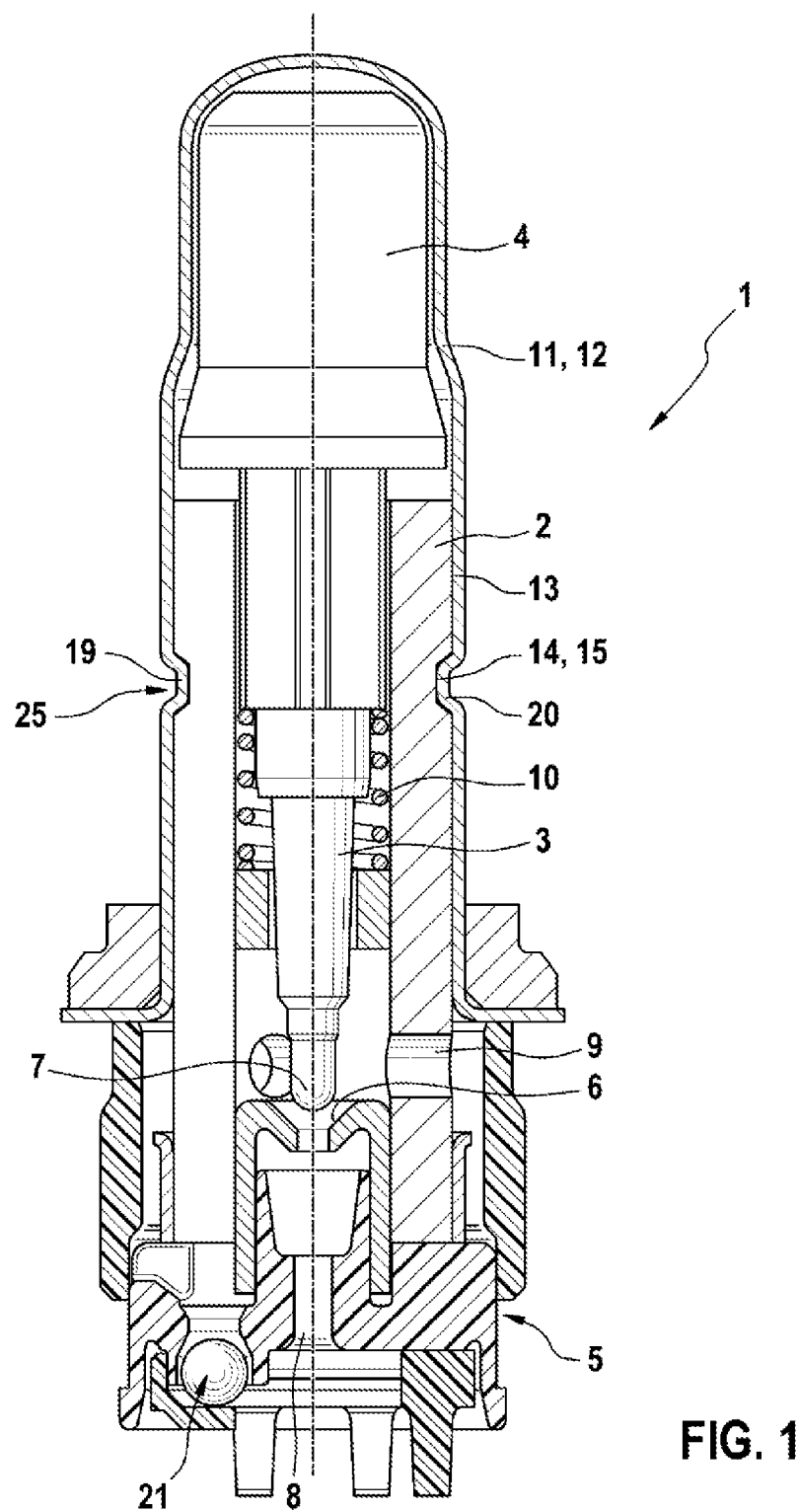
FIG. 1 shows an advantageous valve module illustrated in longitudinal section.

FIG. 1 shows a simplified illustration of a longitudinal section through a valve module 1, in particular for a hydraulic assembly, which can be used, for example, in an antilock system (ABS), in a traction control system (ASR) and/or in an electronic stability program system (ESP), that is to say, advantageously, in a brake system of a motor vehicle.

The valve module 1 comprises a magnetic group, not illustrated here, for generating a magnetic flux, said magnetic group being activatable via electrical terminals, in order to move a valve needle 3 held axially displaceably in a valve basic body 2. For this purpose, the magnetic group expediently has an electrical coil which is formed from a coil winding wound on a winding carrier. The magnetic group generates a magnetic force which acts upon an armature 4 connected firmly to the valve needle 3. The armature 4 is arranged at the end lying opposite the tip 7 of the valve needle and so as to be spaced apart from the valve basic body 2. Furthermore, the valve module 1 has a valve body 5 adjoining the valve basic body 2 and having a small throughflow bore, the valve body 5 comprising a sealing seat 6 in which the sealing region, designed as a sealing body, of the tip 7 penetrates in order to perform the sealing function of the valve module 1 and in order to release or set a volume flow between a valve inlet 8 and a valve outlet 9. The valve needle 3 is urged away from the sealing seat by a helical spring 10, so that the valve needle 3 is guided into the valve seat 6 only as a result of the actuation of the magnetic group. This is therefore what is known as a currentlessly open valve module.

The essentially cylindrical valve basic body 2 is pressed into a housing capsule 11, which is designed as a sheet metal part 12, and is held in this by a pressed-in bond.

The valve basic body 2 has on its outer surface area 13 a groove 14 which is designed as an annular groove 15 and which thus extends over the entire circumference of the valve basic body 2. As can best be seen from FIGS. 2 and 3, the annular groove 15 has an essentially V-shaped cross section, the side flanks 16, 17 of the annular groove 15 being oriented obliquely in such a way that they approach one another toward the groove bottom 18.

As is evident from FIG. 1, material of the housing capsule 11 is advantageously introduced into the annular groove 15 as a result of the plastic deformation of a region 19. The region 19 expediently extends over the entire circumference of the housing capsule 11, so as to form a radially inward-projecting annular bead 20 which is seated in the annular groove 15. Advantageously, for this purpose, the material of the housing capsule 11 is deformed plastically into the region 19 by means of one or more specially designed pressing rams or crimping rams, for example in the manner of collet chuck, the housing capsule 11 being acted upon with a force directed at least essentially radially inward. The V-shaped design of the annular groove 15 has the advantage that an offset of the valve module 1 in the axial direction between the valve basic body 5 and the tool used for plastic deformation, such as, for example, crimping jaws, is compensated automatically. The annular groove 15 in this case has a self-centering action for the tool and the valve basic body 2.

The positive and nonpositive holding device 25, generated by the plastic deformation of the region 19, between the housing capsule 11 and the valve basic body 2 is capable of supporting high forces taking effect during operation, in such a way that the valve basic body 2 is not shifted axially in the housing capsule 11, so that reliable operation of the valve module 1 and, in particular, of a brake system having the valve module 1 can be permanently ensured. The sealing function of the housing cap 2 which surrounds the valve basic body 2 in regions and the armature 4 completely is assisted by the pressed-in bond between the housing capsule 11 and the valve basic body 2. Furthermore, the valve module 1 has a nonreturn valve 21 to safeguard its function.

Figure 2:
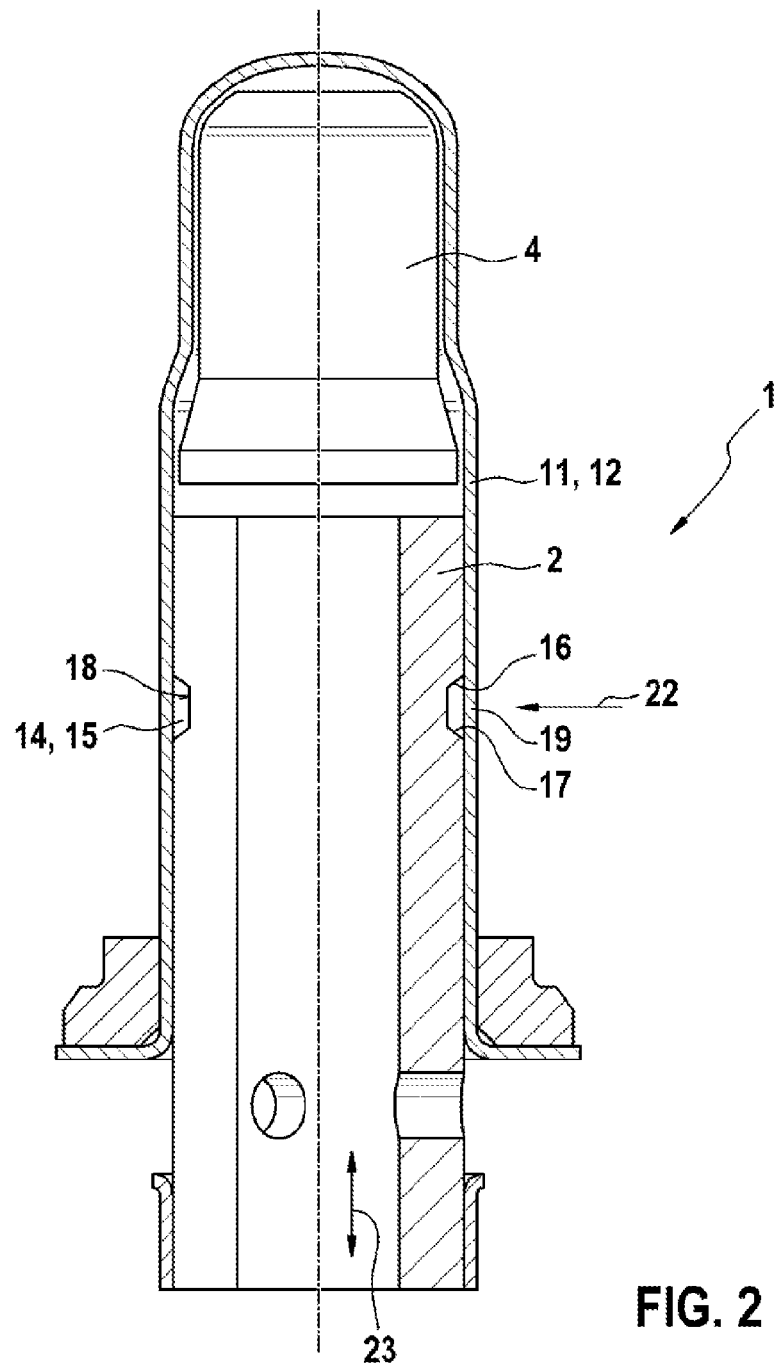
FIG. 2 shows a production step of a production method.

FIG. 2 shows a detail of the valve module 1 without the valve needle 3 in a step of the production process in which the valve basic body 2 is pressed into the housing capsule 11. If, then, the deforming tool is moved radially inward toward the housing capsule 11 in the direction of the arrow 22, axial self-centering takes place, as indicated by a double arrow 23.

Figure 3:
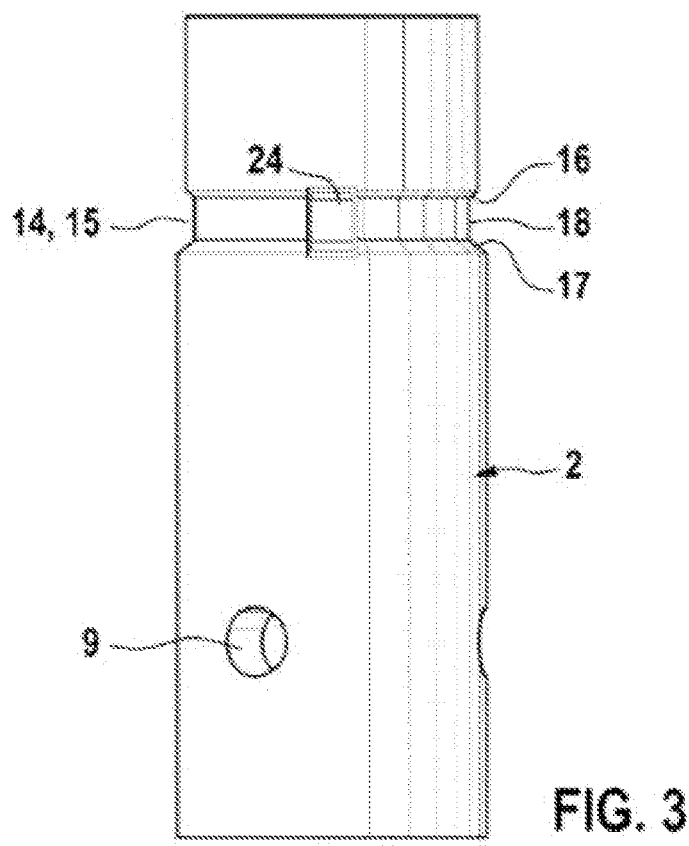
FIG. 3 shows a valve basic body in a top view.

FIG. 3 shows the valve basic body 2 in a top view. In contrast to the preceding exemplary embodiments, the present valve basic body 2 has a smaller diameter above the annular groove 15 than below the annular groove 15. As a result, axial compensation and, overall, the orientation of the valve basic body 2 in the housing capsule 11 can be ensured especially simply.

As is evident, furthermore, from FIG. 3, the valve basic body 2 has in the groove 14 or annular groove 15 one or more recessed pockets 24 formed so as to be distributed over the circumference. The pockets 24 can receive excess material which occurs during the deformation of the housing capsule 11 and can thereby serve, where appropriate, as a safeguard against twisting between the housing capsule 11 and the valve basic body 2. Also, compensation of the axial offset can be improved by means of the recessed pockets 24.

Figure 4:
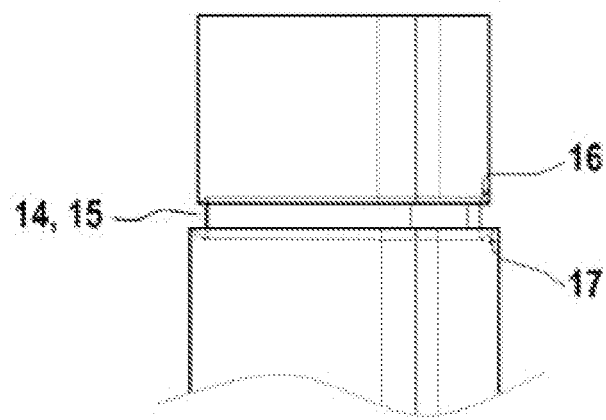
FIG. 4 shows an alternative embodiment of a value module having an uncut annular groove.

Contrary to the exemplary embodiments illustrated, it is also possible to design the groove 14 or annular groove 15 with another cross-sectional shape, such as, for example, with vertical side flanks, as in the case of a conventional annular groove, or with undercuts similar to a dovetail shape as depicted in FIG. 4. It is also possible to have two or more grooves 14 or annular grooves 15 which are spaced apart one above the other, that is to say axially from one another, and which have either the same cross-sectional shape or different cross-sectional shapes. Expediently, the width of the groove 14 or annular groove 15 and its depth and also the tool contour and depth of penetration are coordinated with one another.

The invention claimed is:

1. A valve module, comprising:
    an essentially cylindrical valve basic body,
    a valve needle arranged axially displaceably in the valve basic body,
    a housing cap configured to close the valve basic body at one end, the housing cap including plastically deformed material, and
    at least one holding device configured to hold the housing cap on the valve basic body, the at least one holding device defining at least one depression on an outer surface area of the valve basic body,
    wherein the plastically deformed material of the housing cap is located within said at least one depression,
    wherein the depression is configured as a groove in the outer surface of the valve basic body, the groove being defined by groove walls that are recessed from the outer surface of the valve basic body, and
    wherein at least one recessed pocket is defined within the groove, the at least one recessed pocket being recessed from the groove walls defining the groove.

2. The valve module as claimed in claim 1, wherein at least one side flank of the groove forms a slope.

3. The valve module as claimed in claim 1, wherein the groove has an at least essentially V-shaped cross section.

4. The valve module as claimed in claim 1, wherein the groove has an undercut design.

5. The valve module as claimed in claim 1, wherein the valve basic body has a smaller diameter on one side of the groove than on the other side of the groove.

6. The valve module as claimed in claim 1, wherein a plurality of recessed pockets are defined within the groove that are recessed from the groove walls defining the groove, the plurality of recessed pockets being arranged so as to be distributed around a circumference of the valve basic body.

7. The valve module as claimed in claim 1, wherein the housing cap is designed as a sheet metal part.

8. The valve module as claimed in claim 1, wherein the groove is an annular groove.

* * * * *